US008950000B1

(12) United States Patent
Werner et al.

(10) Patent No.: US 8,950,000 B1
(45) Date of Patent: Feb. 3, 2015

(54) APPLICATION DIGITAL RIGHTS MANAGEMENT (DRM) AND PORTABILITY USING A MOBILE DEVICE FOR AUTHENTICATION

(71) Applicant: Sprint Communications Company L.P., Overland Park, KS (US)

(72) Inventors: Shane R. Werner, Olathe, KS (US); Warren B. Cope, Olathe, KS (US); Von McConnell, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 49 days.

(21) Appl. No.: 13/678,198

(22) Filed: Nov. 15, 2012

Related U.S. Application Data

(63) Continuation of application No. 11/461,247, filed on Jul. 31, 2006, now Pat. No. 8,353,048.

(51) Int. Cl.
*G06F 7/04* (2006.01)
*H04W 12/08* (2009.01)

(52) U.S. Cl.
CPC .................... *H04W 12/08* (2013.01)
USPC .......... 726/27; 726/4; 726/5; 726/6; 713/167; 713/168; 380/249; 380/44; 380/247; 455/411

(58) Field of Classification Search
CPC ............ H04L 9/32; G06F 21/44; G06F 21/35
USPC ............. 726/4, 26–27; 380/44, 249; 713/167; 455/411
See application file for complete search history.

(56) References Cited

U.S. PATENT DOCUMENTS

| | | | |
|---|---|---|---|
| 7,027,808 B2 | 4/2006 | Wesby | |
| 7,120,928 B2 * | 10/2006 | Sheth et al. | 726/4 |
| 7,152,160 B2 * | 12/2006 | Lantto et al. | 713/168 |
| 7,162,543 B2 | 1/2007 | Fischer et al. | |
| 7,346,025 B2 * | 3/2008 | Bryson | 370/328 |
| 7,362,869 B2 | 4/2008 | Landrock | |
| 7,415,721 B2 | 8/2008 | Fransdonk | |
| 7,447,907 B2 | 11/2008 | Hart, III et al. | |
| 7,469,139 B2 * | 12/2008 | van de Groenendaal | 455/411 |
| 7,469,341 B2 * | 12/2008 | Edgett et al. | 713/176 |
| 7,484,103 B2 | 1/2009 | Woo et al. | |
| 7,512,806 B2 | 3/2009 | Lemke | |
| 7,529,929 B2 | 5/2009 | Asokan et al. | |
| 7,545,941 B2 | 6/2009 | Sovio et al. | |
| 7,591,017 B2 | 9/2009 | Watkins et al. | |

(Continued)

OTHER PUBLICATIONS

Haverinen H, Cellular access control and charging for mobile operator wireless LAN, Dec. 2002, IEEE, vol. 14, pp. 52-60.*

(Continued)

*Primary Examiner* — Dede Zecher
*Assistant Examiner* — Viral Lakhia

(57) ABSTRACT

A method, system, and medium are provided for operating a computing device and a mobile device to access computer software with a secure access and to access a packet network, and for operating a computer software on a mobile device with different computing devices. A mobile device is used to authenticate a user's access to computer software. The computer software may reside on the mobile device, the user's computing device, or another computing device. A unique identifier is stored in the mobile device associated with the computer software to enable the authentication.

20 Claims, 7 Drawing Sheets

(56) References Cited

U.S. PATENT DOCUMENTS

| | | | |
|---|---|---|---|
| 7,734,549 B2 | 6/2010 | Dabbish et al. | |
| 7,783,702 B2 | 8/2010 | Liu et al. | |
| 7,787,863 B2* | 8/2010 | van de Groenendaal | 455/411 |
| 7,788,709 B1 | 8/2010 | Henry et al. | |
| 7,809,953 B2 | 10/2010 | Little et al. | |
| 7,860,032 B2* | 12/2010 | Abrol et al. | 370/271 |
| 8,001,584 B2* | 8/2011 | Lortz et al. | 726/5 |
| 8,089,520 B2 | 1/2012 | Ko et al. | |
| 8,151,322 B2* | 4/2012 | Chen et al. | 726/4 |
| 8,181,262 B2* | 5/2012 | Cooper et al. | 726/28 |
| 2002/0059516 A1 | 5/2002 | Turtiainen et al. | |
| 2002/0126652 A1 | 9/2002 | Ha et al. | |
| 2002/0133722 A1 | 9/2002 | Levanon et al. | |
| 2003/0037254 A1* | 2/2003 | Fischer et al. | 713/200 |
| 2003/0105812 A1 | 6/2003 | Flowers et al. | |
| 2003/0182572 A1 | 9/2003 | Cowan et al. | |
| 2003/0204472 A1 | 10/2003 | Yamagishi | |
| 2004/0002902 A1 | 1/2004 | Muehlhaeuser | |
| 2004/0117663 A1 | 6/2004 | Colvin | |
| 2004/0172535 A1 | 9/2004 | Jakobsson et al. | |
| 2004/0255169 A1 | 12/2004 | Little et al. | |
| 2005/0004875 A1 | 1/2005 | Kontio et al. | |
| 2005/0015618 A1 | 1/2005 | Schneider et al. | |
| 2005/0050318 A1* | 3/2005 | Alone et al. | 713/155 |
| 2005/0055578 A1* | 3/2005 | Wright et al. | 713/201 |
| 2005/0080815 A1 | 4/2005 | Inoue et al. | |
| 2005/0091539 A1 | 4/2005 | Wang et al. | |
| 2005/0144459 A1* | 6/2005 | Qureshi et al. | 713/176 |
| 2005/0154795 A1 | 7/2005 | Kuz et al. | |
| 2005/0278787 A1 | 12/2005 | Naslund et al. | |
| 2006/0036555 A1 | 2/2006 | Beck et al. | |
| 2006/0074985 A1 | 4/2006 | Wolfish et al. | |
| 2006/0106726 A1 | 5/2006 | Raley et al. | |
| 2006/0123463 A1 | 6/2006 | Yeap et al. | |
| 2006/0141962 A1 | 6/2006 | Forbes et al. | |
| 2006/0149846 A1 | 7/2006 | Schuba | |
| 2006/0206709 A1* | 9/2006 | Labrou et al. | 713/167 |
| 2006/0235796 A1 | 10/2006 | Johnson et al. | |
| 2006/0242404 A1 | 10/2006 | Su | |
| 2006/0272032 A1 | 11/2006 | Jogand-Coulomb et al. | |
| 2006/0282395 A1 | 12/2006 | Leibowitz | |
| 2007/0010236 A1 | 1/2007 | Allen et al. | |
| 2007/0079113 A1* | 4/2007 | Kulkarni et al. | 713/150 |
| 2007/0113082 A1* | 5/2007 | Lai et al. | 713/168 |
| 2007/0119953 A1 | 5/2007 | Tsao | |
| 2007/0124372 A1 | 5/2007 | Liu et al. | |
| 2007/0154014 A1* | 7/2007 | Aissi et al. | 380/249 |
| 2008/0005783 A1 | 1/2008 | Polzin et al. | |
| 2008/0022387 A1 | 1/2008 | Leung | |
| 2008/0040618 A1 | 2/2008 | Andersson et al. | |
| 2008/0295159 A1* | 11/2008 | Sentinelli | 726/6 |
| 2009/0158032 A1* | 6/2009 | Costa et al. | 713/156 |
| 2009/0268695 A1* | 10/2009 | Zhao et al. | 370/336 |
| 2013/0039488 A1* | 2/2013 | Smith et al. | 380/44 |

OTHER PUBLICATIONS

Non-Final Office Action mailed Apr. 9, 2009 in U.S. Appl. No. 11/456,951.

Final Office Action mailed Nov. 10, 2009 in U.S. Appl. No. 11/456,951.

Notice of Allowance mailed Jan. 26, 2010 in U.S. Appl. No. 11/456,951.

Kwon Il Lee, et al; "A DRM Framework for Secure Distribution of Mobile Contents;" Lecture Notes Computer Science 3090; 2004; pp. 905-914: Springer-Verlag Berlin Heidelberg 2004.

* cited by examiner

APPLICATION DIGITAL RIGHTS MANAGEMENT (DRM) AND PORTABILITY USING A MOBILE DEVICE FOR AUTHENTICATION

CROSS-REFERENCE TO RELATED APPLICATIONS

This patent application is a continuation of U.S. patent application Ser. No. 11/461,247 that is entitled "APPLICATION DIGITAL RIGHTS MANAGEMENT (DRM) AND PORTABILITY USING A MOBILE DEVICE FOR AUTHENTICATION" and that was filed on Jul. 31, 2006. U.S. patent application Ser. No. 11/461,247 is hereby incorporated by reference into this patent application.

FEDERALLY SPONSORED RESEARCH OR DEVELOPMENT

Not Applicable.

BACKGROUND

Although mobile devices have the ability to handle telephone calls, they are unique from telephones connected to wireline systems. Mobile devices contain unique identifiers which allow them to connect and be identified in wireless networks. Most telephones in a wireline system do not have these characteristics except for various voice over packet (VOP) telephones that use internet protocol (IP) addresses as unique identifiers. In the wireless environment, these unique identifiers provide service providers with a way to identify and control the mobile devices.

The unique identifiers vary according to the type of wireless technology that may be used and the service provider. The unique identifiers are used to identify a user that may want access to a wireless network. The unique identifier identifies the mobile device to the service provider and wireless network. The service provider can use the unique identifiers in a mobile device to verify information about the user or the device such as the level of service that is to be provided, if the user is allowed to originate telephone calls, the location of the mobile device, etc. The unique identifiers may include such items as a username and password embedded in the mobile device, an IP address, an ESN, or an IMEI. These unique identifiers are the more common ones that are associated with mobile devices, but there are others that can be used. As wireless technologies evolve, the number of unique identifiers will increase and evolve as well.

One of the challenges that users face today is having the ability to migrate information from one computing device to another computing device. Usually, a user has to install a computer software program onto a computing device in order to use the computing device. However, if the user is mobile and needs to use the computer software program on a second computing device, the user has to find a way to re-install the computer software program to operate at the second computing device since the computer software program is already stored on the first computing device.

The first challenge is for the user to operate the computer software program on the second computing device when the computer software program is already stored on the first computing device. The user may have to re-install the computer software program on the second computing device and go through a re-authentication process with the second installation. If the user does not have the authentication information, the user will be prevented from accessing the computer software program although the computer software program may have been installed properly.

Another challenge for the user, even after gaining access to the second computing device and having the computer software program installed, is to have access to the data files that were originally used and stored on the first computing device with the computer software program. One current solution for accessing such data files is to store the data files on a removable media device such as a floppy disk, a CD, a flash memory (such as a USB memory), or a removable disk drive. The user can store the data files on the removable media device and later use the removable media device with the computer software program (if the user has access). Unfortunately, the user has to maintain the most recent version of the data files either on the first computing device or on the removable media device. In addition, the user needs the authenticated version of the computer software program to access the data files. At some point, the first computing device and the removable media device may need to be synchronized to have the same data. Secondly, the user has to take care not to damage the removable media device. Thirdly, the removable media device has to be small enough to not distract the user when it is moved from place to place. If the removable media device is too bulky or cumbersome, the user may not find the removable media device practical and may lose interest in using such device. Fourthly, the user has to use an authenticated version of the computer software program with the data files.

For the reasons discussed above, a solution is needed that allows a user to use an authenticated version of a computer software program even when the user is using different types of computing devices. The solution needs to allow the user to access the user's data files and the computer software program without the need for a removable media device and without the need for prompting for a key or re-authentication information. The solution also needs to allow the user to access the Internet from the different types of computing devices while using the computer software program and data files.

SUMMARY

The present invention is defined by the claims below. Embodiments of the present invention solve at least the above problems by providing a system, method, and media for, among other things, operating a computing device and a mobile device to access computer software with a secure access and to access a packet network, and for operating a computer software on a mobile device with different computing devices.

In a first aspect, a computer system having a processor and a memory for executing a method for operating a computing device and a mobile device to access computer software with a secure access is provided that includes communicating between the computing device and the mobile device over a connection. A set of information is accessed on the mobile device from the computing device for an authentication. A user is authenticated with the mobile device at the computing device to operate either or both a first computer software on the mobile device or a second computer software not on the mobile device. Either the first computer software or the second computer software is operated from the computing device.

In another aspect, a computer system having a processor and a memory for executing a method for operating a computing device and a mobile device to access computer software with a secure access and to access a packet network is provided that includes communicating between the computing device and the mobile device over a connection. A set of information is accessed on the mobile device from the computing device for an authentication. A user is authenticated with the mobile device at the computing device to operate either or both a first computer software on the mobile device or a second computer software not on the mobile device. Either the first computer software or the second computer software is operated from the computing device. From the computing device, the packet network is accessed through the mobile device.

In yet another aspect, computer-readable media containing thereon computer-readable code for causing a mobile device to perform a method for authenticating a user at a computing device is provided that includes receiving at the mobile device notifications that a user is attempting an access to a computer software. Data is received associated with the computer software. A determination of an authorization assigned to the user is facilitated to access the computer software from information stored on either the mobile device or another computing device. Other information is provided based on the authorization to the computing device to allow the access to the computer software.

In yet another aspect, a computer system having a processor and a memory for executing a method for operating a first computer software on a mobile device with different computing devices is provided that includes loading the first computer software onto the mobile device. A unique identifier is provided to associate with the first computer software. The unique identifier is stored with the first computer software or stored in the mobile device. The first computer software is configured to execute from the mobile device with the unique identifier. The mobile device is connected to a first computing device. The first computing device operates the first computer software.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
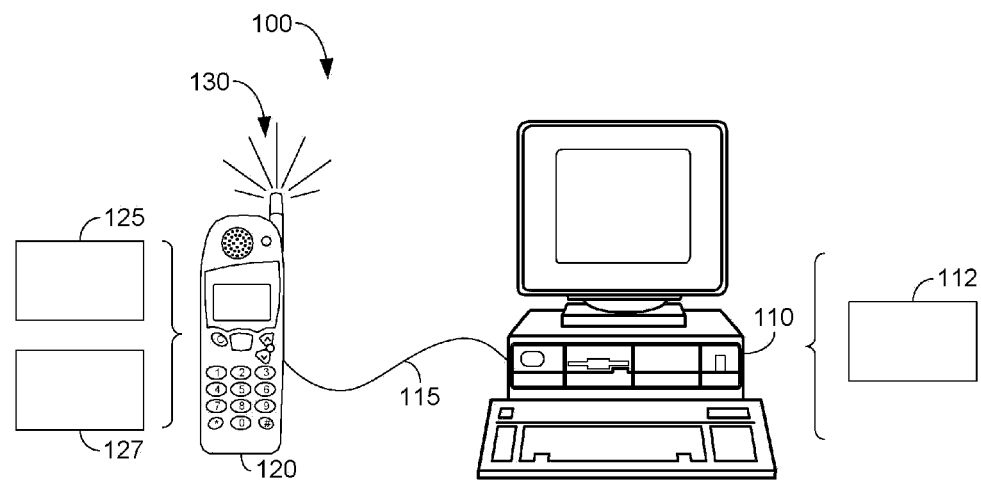
FIG. 1 is a block diagram of an exemplary operating environment illustrating a computing device accessing authentication information and computer software installed on a mobile device.

Embodiments of the present invention provide systems, methods, and media for operating a computing device with a mobile device wherein the mobile device stores authentication information.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these.

ACRONYMS

AAA Authentication, Authorization, and Accounting
BLUETOOTH Technology for connecting devices using a short-ranged wireless connection.
CD Compact Disk
CDMA Code Division Multiple Access
DRM Digital Rights Management
EDGE Enhance Data Rates for GSM (and TDMA) Evolution
ESN Electronic Serial Number
EV-DO Evolution Data Only or Evolution Data Optimized
GPRS General Packet Radio Services
GSM Global System for Mobile Communications
IMEI International Mobile Equipment Identity
IP Internet Protocol
OS Operating System
PDA Personal Digital Assistant
UMTS Universal Mobile Telephone System
USB Universal Serial Bus
VOP Voice Over Packet
W-CDMA Wide Code Division Multiple Access
WiFi Wireless Fidelity (802.11 network)
WiMAX Worldwide Interoperability for Wireless Access (802.16 network)
ZIGBEE Technology for connecting devices using a short-ranged wireless connection.

Further, various technical terms are used throughout this description. A definition of such terms can be found in Newton's Telecom Dictionary by H. Newton, 21st Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Computing Software Access and Authentication with a Mobile Device

Embodiments of the present invention may be implemented to allow a user to operate computer software using authentication information on a mobile device. The computers software may be stored on the mobile device or on a computing device. The authentication information is associated with the computer software.

In FIG. 1, an exemplary operating environment 100 is shown with a computing device 110 connected to a mobile device 120 over a connection 115. The computing device 110 may be a computer, a workstation, a server, or a PDA. The mobile device 120 may be a mobile phone, a handheld computer, or a PDA. The connection 115 may be a USB connection, an Ethernet connection, a serial port connection, a parallel port connection, or a wireless connection. The wireless connection may include BLUETOOTH, infrared, WiFi, and WiMax to name a few. The types of computing devices, mobile device, and connections listed above are not exhaustive and may include others not mentioned in this specification.

Within mobile device 120, an authentication 125 may be stored in the memory of mobile device 120. Authentication 125 may be a set of unique identifiers associated with mobile device 120. The set of unique identifiers may include a username, a telephone number, a password, an IP address, an ESN, and an IMEI. It is well known in the arts that mobile devices such as mobile telephones have unique identifiers to identify them in a wireless network.

Mobile device 120 also includes computer software 127 that may be pre-loaded. Computer software 127 may be an application or computer program that may be executed by a user. Mobile device 120 has a capacity in the gigabyte range to store various computer software. Computer software 127 may use authentication 125 to enable a user to access and execute computer software 127. The use of authentication 125 may be performed in several exemplary ways. First, upon an installation of computer software 127, the user may be required to provide authentication 125 which is stored in mobile device 120. Secondly, a computer program may automatically associate authentication 125 with computer software 127 when computer software 127 is stored in mobile device 120.

Signal 130 illustrates the wireless capability of mobile device 120. Although not shown here, mobile device 120 may communicate using a variety of wireless technologies including, but not limited to, CDMA, GPRS, GSM, EDGE, EV-DO, W-CDMA, UMTS. WiFi, and WiMax. The transmit and receive capabilities using these technologies will go through the exemplary signal 130.

Going back to computing device 110, computing device 110 includes computer software 112. Computer software 112 is similar to computer software 127. However, if a user installs computer software 112 in computing device 110, the user may be required to provide authentication information similar to providing a key when installing new computer software. As discussed above, the user may provide authentication information during the installation process at computing device 110 which matches authentication 125. Or, a computer program may automatically associate authentication 125 with computer software 127 when a connection is made between computing device 110 and mobile device 120.

Figure 2:
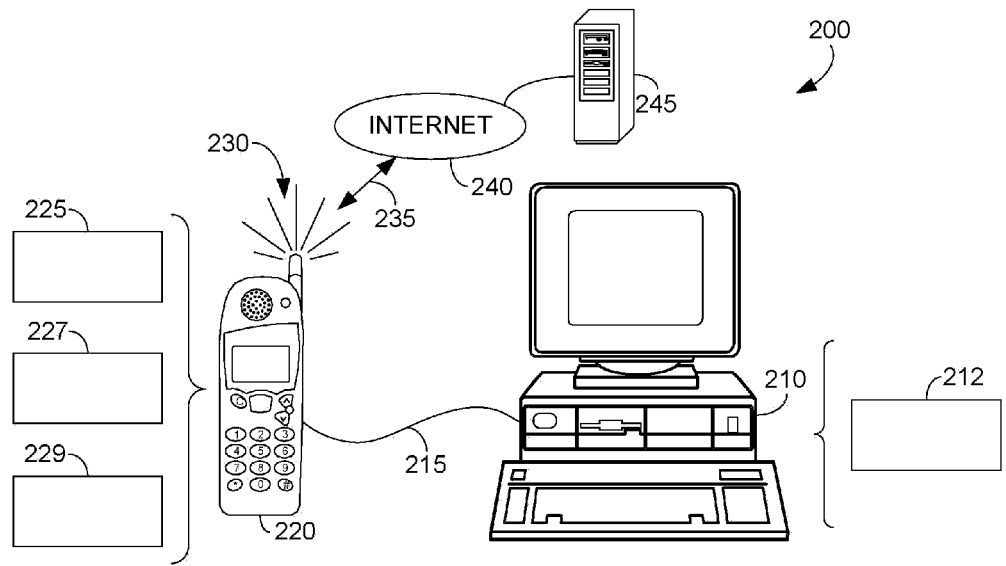
FIG. 2 is a block diagram of an exemplary operating environment illustrating a computing device accessing authentication information installed on a mobile device and accessing the Internet through the mobile device.

Turning now to FIG. 2, an exemplary operating environment 200 is shown similar to FIG. 1. A computing device 210 is connected to a mobile device 220 over a connection 215. The computing device 210 represents the same computing device as computing device 110. The computer software 212 represents the same computer software as computer software 112. The connection 215 represents the same connection as connection 115. The mobile device 220 represents and includes the same functionality as mobile device 120 with an addition. Mobile device 220 includes a data access 229. Authentication 225 represents the same functions as authentication 125. Computer software 227 represents the same functions as computer software 127.

Data access 229 allows mobile device 220 to access the Internet 240 over a connection 235. Connection 235 represents the various devices and signals that are involved in order to allow mobile device 220 to connect to the Internet 240. The discussion of how mobile device 220 connects to the Internet 240 is beyond the scope of this invention and shall not be discussed here. However, one of ordinary skill in the art understands that in today's technologies, home agents, foreign agents, and AAA servers may be involved as part of connection 235 to provide data access 229 to the Internet 240.

Within the Internet 240, a server 245 may exist to communicate with mobile device 220 for authentication activities. Server 245 may be used for verification purposes when a user tries to access or operate a specific application or computer program. For example, when the user attempts to access an application or a computer program, identified as either computer software 212 or 227, mobile device 220 may send authentication 225 or a subset thereof to server 245 to verify authorization information. Server 245 may return a reply to mobile device 220 which sends information to computing device 210 to allow authorized use to computer software 212 or 227. This example can occur for subscription services allowing the user to use computer software, such as virus detection software, over a time period.

Figure 3:
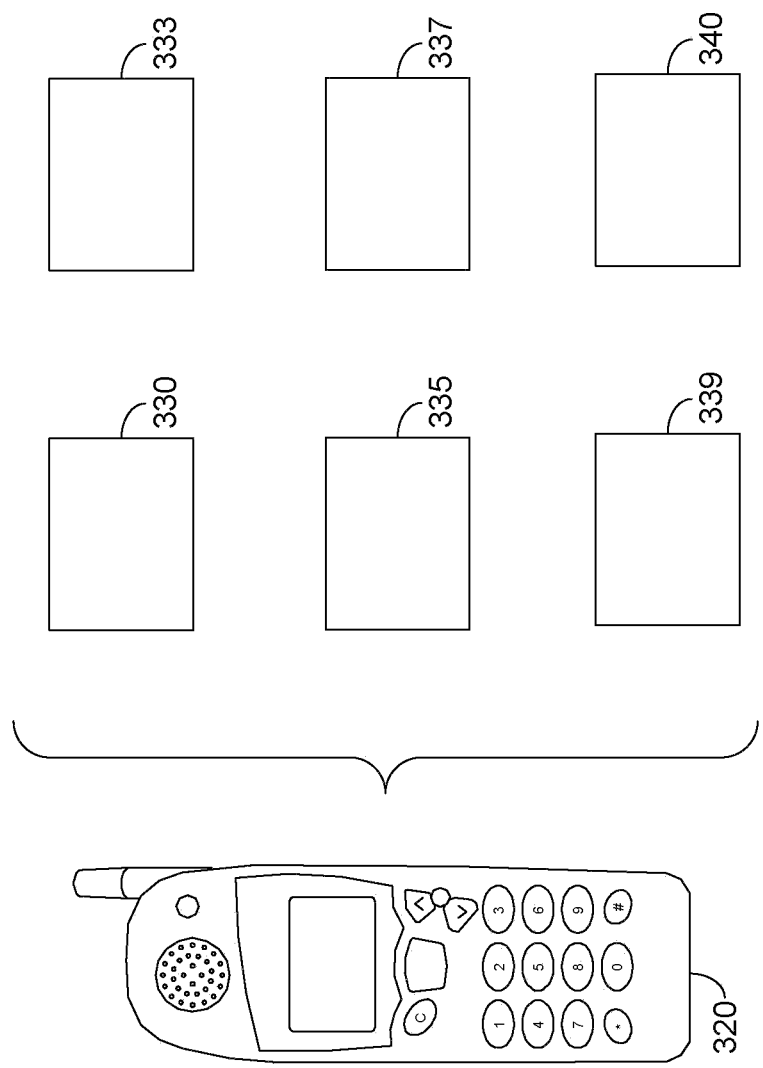
FIG. 3 is a block diagram of an exemplary computer software installed on a mobile device when implementing an embodiment of the present invention.

In FIG. 3, exemplary computer software 300 is shown with a mobile device 320. Mobile device 320 includes an exemplary set of software identified by an operating component 330, a receiving component 333, a facilitating component 335, an validating component 337, an output component 339, and a data access component 340. Mobile device 320 is similar to mobile devices 120 and 220 discussed above.

It has already been stated above that mobile device 320 is capable of holding a significant amount of information in its memory. Mobile devices can contain storage capacities in the gigabyte range allowing a variety of software information to be stored. In FIG. 3, operating component 330 represents the software that runs the mobile device. Operating component 330 may also include storing computer software such as computer software 127 and 227. Receiving component 333 represents the software for collecting or monitoring for information that a user is attempting to access or operate computer software 112, 127, 212, or 227. Receiving component 333 also represents the software for receiving data about computer software 112, 127, 212, or 227. In order to know what authentication is required, receiving component 333 has to retrieve or receive information associated with the computer software.

When mobile device 320 has authentication 125 or 225 as discussed above along with information gathered by receiving component 333, facilitating component 335 operates to authorize a user to gain access to the computer software. Facilitating component 335 may attempt to respond to information received by other components when the user attempts to access computer software, or facilitating component 335 may interact with other computing devices such as server 245 to determine the authorization for the user.

Validating component 337 represents software for authentication 125 or 225. As discussed above, this information may include a set of unique identifiers associated with mobile device 320. The set of unique identifiers may include a username, a telephone number, a password, an IP address, an ESN, and an IMEI. It may include other unique information not mentioned here. Although validating component 337 may vary according to the implementation, this software represents the specific information that identifies the mobile device or identifies unique characteristics required for authentication purposes. Other components in mobile device 320 may retrieve information in validating component 337 to accomplish the authentication or authorization process.

Output component 339 represents the exemplary software to send information to computing devices authorizing or acknowledging an authorization for the user to use computer software 112, 127, 212, or 227. Output component 339 may include a key to be used by the computer software, a reply, or a subset of validating component 337. Depending on the implementation of an embodiment, information will be sent from mobile device 320 to a computing device giving access to the user at the computing device. The way in which this information will be delivered as well as what information will be delivered may vary especially when the computer software is stored on the mobile device versus the computing device. For example, if the computer software is stored on the mobile device, there may be little information delivered to the computing device regarding authorization. The user may receive an acknowledgement to access the computer software on mobile device 320. However, if the computer software is loaded in the computing device 110 or 210, a much more involved authentication process may occur with a set of information being delivered to the computing device from output component 339.

Another software that may be found in mobile device 320 is data access component 340. Data access component 340 represents the exemplary software to access the Internet 240. Data access component 340 is associated with data access 229 discussed above.

The various software components represent exemplary software that may be implemented in an embodiment of the present invention. In different embodiments, the software components may be represented differently. In some cases, various components may be combined. In other cases, some components may be removed. The idea here is to illustrate the possibilities in implementing various embodiments for the purposes of using mobile device 320 for authentication activities as well as for storing computer software to operate with a computing device.

With FIGS. 1-3, embodiments of the present invention may be implemented using the processes discussed below in FIGS. 4-8.

Figure 4:
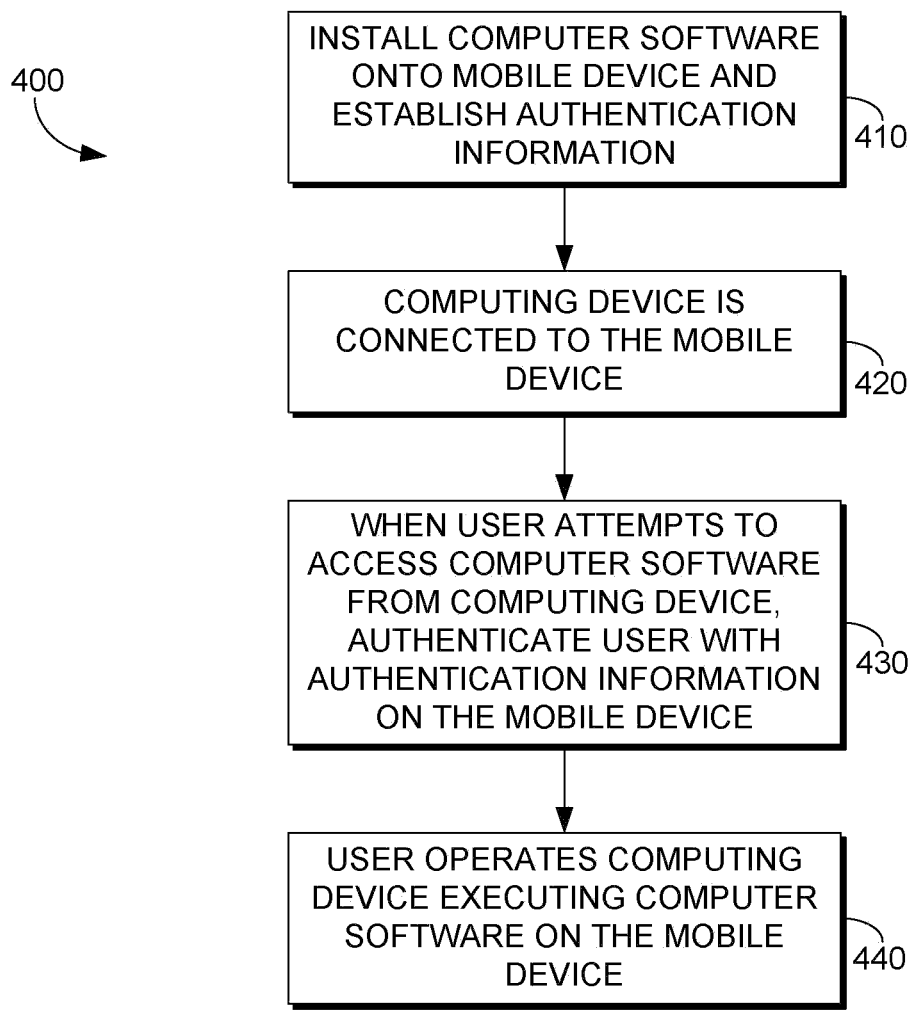
FIG. 4 is a flowchart of an exemplary process for operating a computing device using authentication information and computer software installed on a mobile device.

In FIG. 4, a process for operating a computing device using authentication information and computer software installed on a mobile device is provided in a method 400. In a step 410, computer software 127 is installed in mobile device 120. Authentication information such as authentication 125 is established in mobile device 120. Although not shown here, the installation of computer software 127 is similar to installing computer software on a computing device. Various techniques may be used to install computer software 127. Some of which may include the receipt of computer software 127 over a wireless connection.

In a step 420, computing device 110 is connected to mobile device 120 using the various connections (connection 115) discussed above in FIG. 1. This connection enables computing device 110 and mobile device 120 to communicate together.

After computer software 127 is installed in mobile device 120 in step 410, when a user attempts to access computer software 127 from computing device 110, the user is authenticated with authentication information on mobile device 120 in a step 430. In an embodiment of the present invention, mobile device 120 may appear as a letter drive when it is connected to computing device 110.

In a step 440, a user operates computing device 110 executing computer software 127 from mobile device 120. In this step, the user may run an application that has been stored on mobile device 440 after the authentication process completes. In other embodiments, an authentication process may not be required as the user may have pre-loaded authentication information with computer software 127 when it was initially installed.

Figure 5:
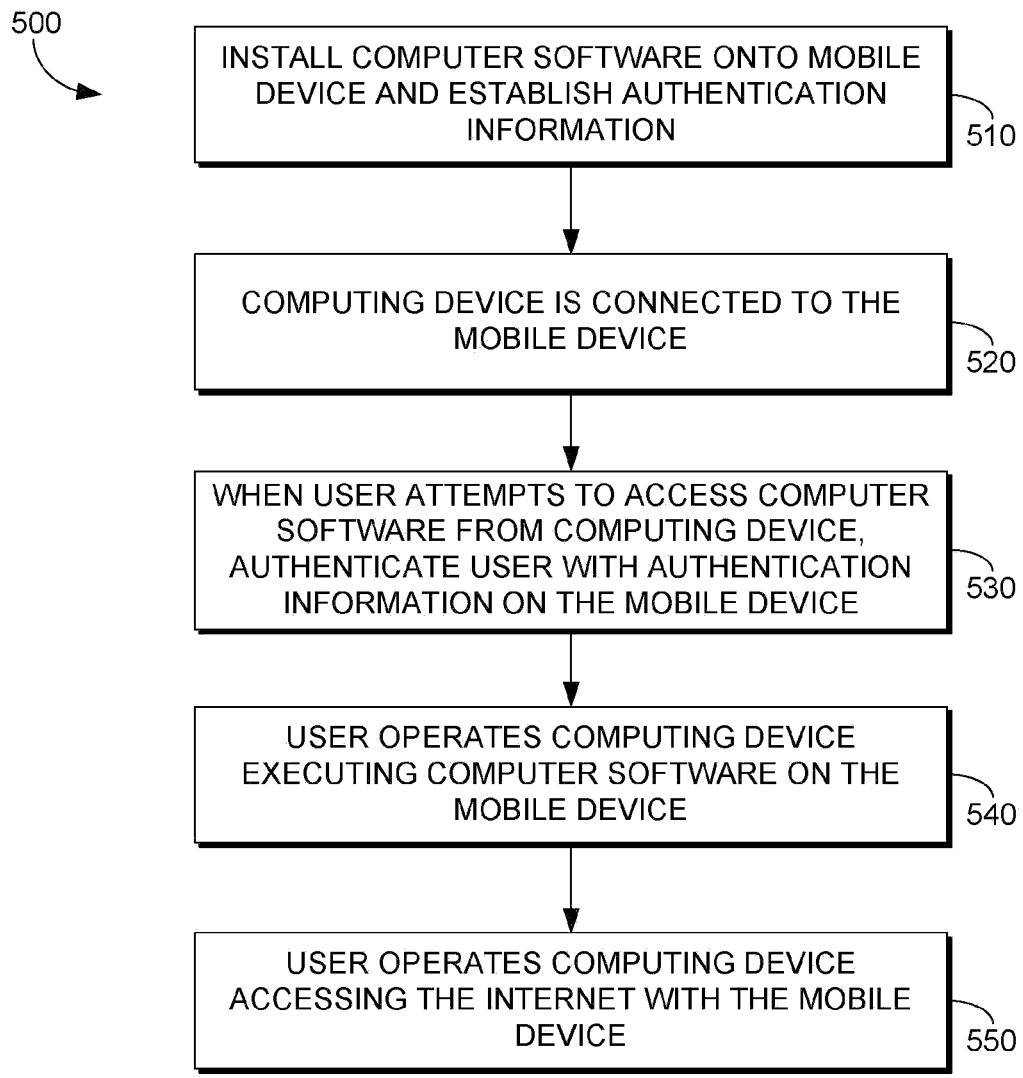
FIG. 5 is a flowchart of an exemplary process for operating a computing device using authentication information and computer software installed on a mobile device and accessing the Internet through the mobile device.

Turning now to FIG. 5, a process for operating a computing device using authentication information and computer software installed on a mobile device and accessing the Internet through the mobile device is shown in a method 500. Method 500 is similar to method 400 with some additions. Method 500 includes an ability of mobile phone 120 to provide data access as shown in mobile phone 220.

In a step 550, a user operates computing device 210 to access the Internet 240 through mobile device 220. To facilitate this access, mobile phone 220 has data access 229 and connection 235 indicating the capability to access the Internet 240. Step 550 illustrates that mobile device 220 may provide computer software 227 to computing device 210 while at the same time providing internet access. Steps 510, 520, 530, and 540 are similar to steps 410, 420, 430, and 440, and are not discussed further.

Figure 6:
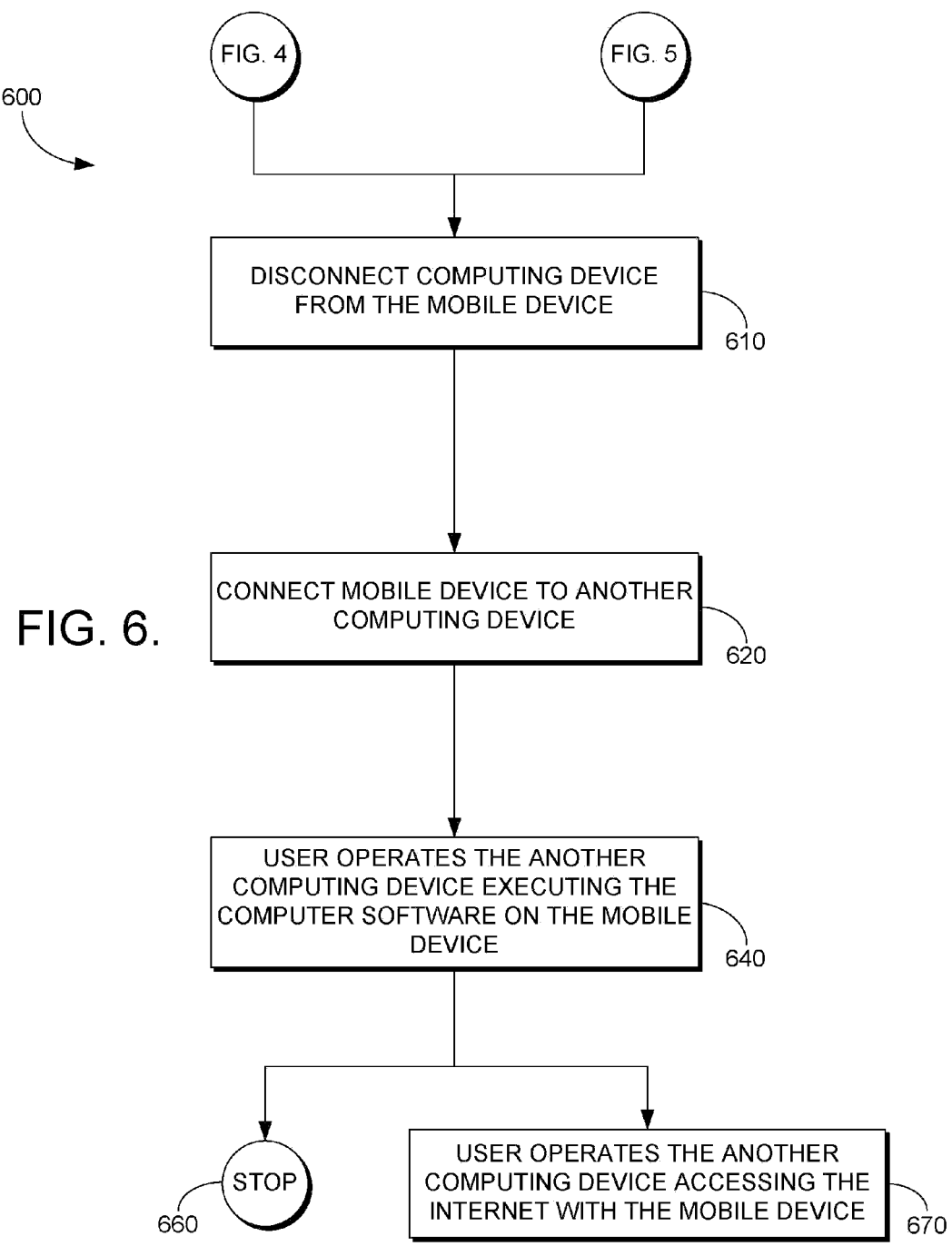
FIG. 6 is a flowchart of an exemplary process for terminating an operation of a computing device with a mobile device and operating another computing device with the mobile device.

In FIG. 6, a process for terminating an operation of a computing device with a mobile device and operating another computing device with the mobile device is shown in a method 600. Method 600 begins as a continuation of the steps in FIGS. 4 and 5.

After the user completes operating at either computing device 110 or 210, the user may disconnect the computing device from the mobile device in a step 610. As discussed above, the computer software is stored on the mobile device and some or all of the data files may be stored on the mobile device. Later, the user desires to use another computing device and connects the mobile device to this new computing device as shown in a step 620. The user operates the new computing device using the computer software on the mobile device in a step 640. In a step 670, the user accesses the Internet 240 while also operating computing device 110 or 210.

As shown in the steps 610-640, the user has reconnected to the new computing device illustrating that the functionality that the user had in methods 400 and 500 surrounding authentication, in respective FIGS. 4 and 5 may be used again in method 600. The mobile device acts as the storage device which may be connected to different computing devices. Method 600 illustrates that the user may use different computing devices but still have an ability use the same computer software and data files from the mobile device.

Figure 7:
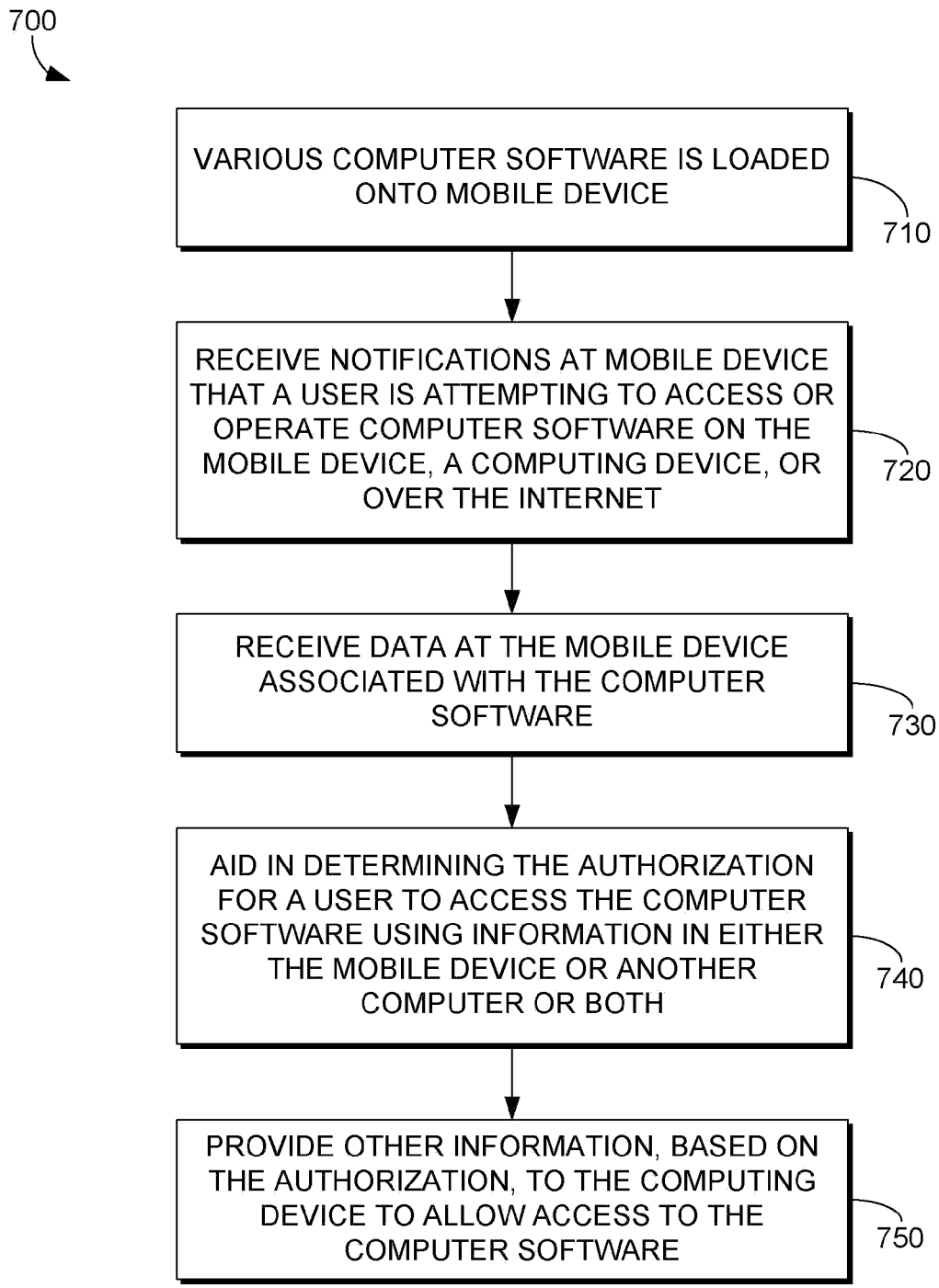
FIG. 7 is a flowchart of an exemplary process for operating exemplary computer software in a mobile device when implementing an embodiment of the present invention.

In FIG. 7, a process for operating exemplary computer software in a mobile device when implementing an embodiment of the present invention is shown in a method 700. Method 700 illustrates the actions of computer-readable media installed on a mobile device.

In a step 710, various computer software is loaded onto mobile device 120 or 220. In a step 720, mobile device 120 or 220 receive notifications that a user is attempting to access or operate computer software on mobile device 120 or 220, computing device 110 or 210, or over the Internet 240. The computer software is represented by computer software 112, 127, 212, or 227. In a step 730, data is received at mobile device 120 or 220 associated with the computer software. This data may be in the form of requests to determine the authorization or permitted access for the user. In a step 740, mobile device 120 or 220 operates to aid in determining the authorization for the user to access computer software 112, 127, 212, or 227. Mobile device 120 or 220 uses authentication information stored in the mobile device or at a server or both to aid in the determination of the authorization. As discussed above, in one case, an acknowledgement is provided based on the unique identifier information stored in the mobile device. In another case, a unique identifier is provided as a key. In yet another case, a unique identifier is provided to a server for verification such as for a subscription. In a step 750, information is provided from mobile device 120 or 220, based on the authorization, to computing device 110 or 210 to allow access to computer software 112, 127, 212, or 227.

Figure 8:
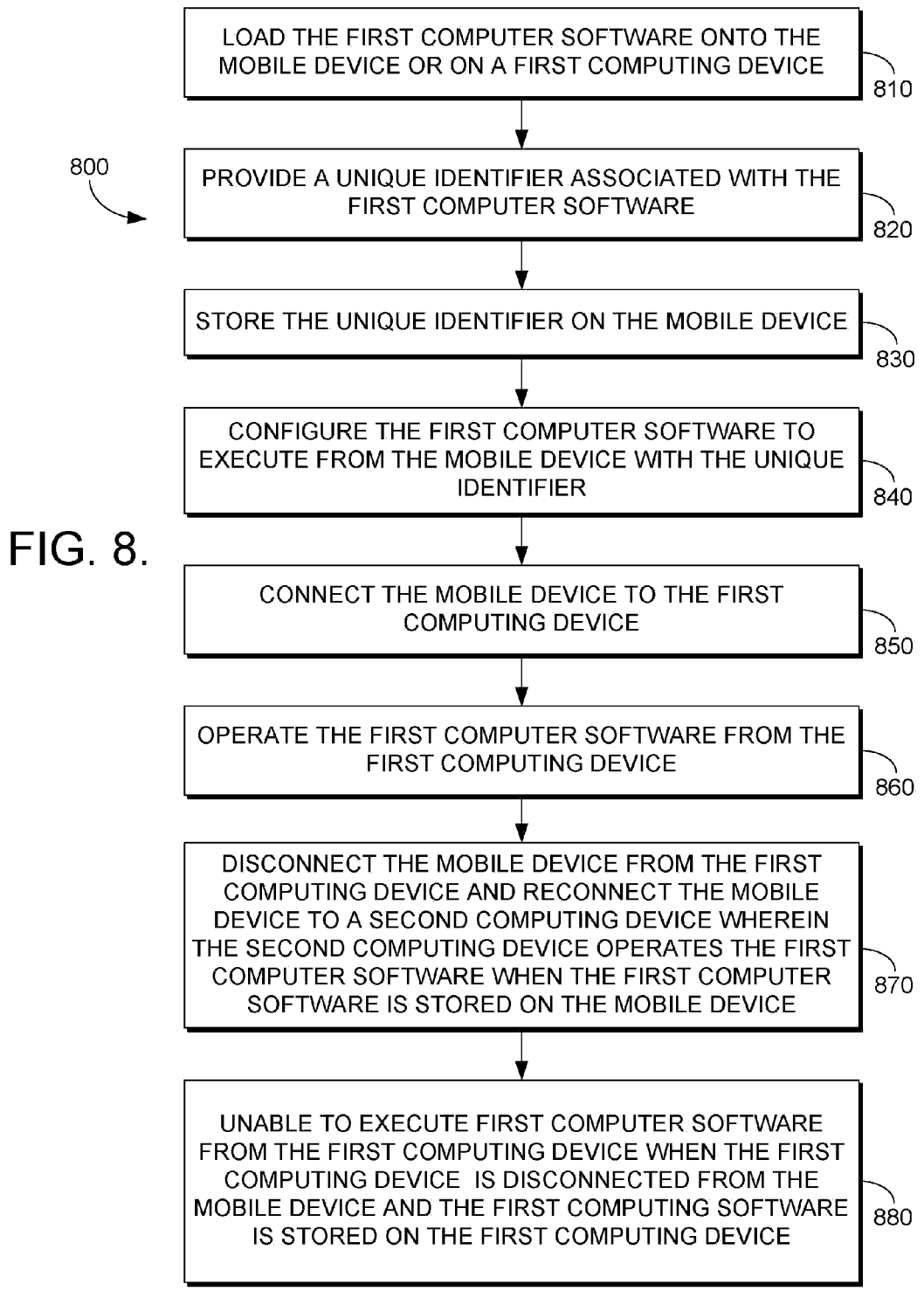
FIG. 8 is a flowchart of an exemplary process for using unique identifiers in a mobile device for authenticating a user at a computing device.

Turning now to FIG. 8, a process for using unique identifiers in a mobile device for authenticating a user at a computing device is shown in a method 800. In a step 810, computer software is loaded onto either the mobile device or a first computing device. It was discussed above how the loading process could occur and shall not be discussed here. In a step 820, a unique identifier is provided associated with the computer software. In a step 830, the unique identifier is stored on the mobile device. In a step 840, the computer software is configured or compiled to execute from the mobile device with the unique identifier. In a step 850, the mobile device is connected to the first computing device. In a step 860, a user operates the computer software at the first computing device.

Steps 810-860 represent implementations of embodiments of the present invention whereby an authentication process occurs to allow access to computer software by the user. The remaining steps illustrate what happens when the mobile is disconnected from the first computing device.

In a step 870, the mobile device is disconnected from the first computing device and reconnected to a second computing device. Two situations may occur depending on whether the computer software is stored on the mobile device or stored on the first computing device. Where the computer software is stored on the mobile device, the user may operate the computer software from the second computing device. Authentication is probably not needed since the authentication information is provided during initial installation of the computer software on the mobile device where the authentication information resides. However, if the computer software is stored on the second computing device, an authentication process may occur when the mobile device is connected to the second computing device. The mobile device may connect to a server through the Internet to verify access at the second computing. The mobile device may directly provide authentication information to the second computing device to allow access by the user to the computer software stored on the second computing device.

In a step 880, because the first computing device was disconnected from the mobile device, the user can no longer execute the computer software at the first computing device even when the computer software is stored on the first computing device. The mobile device provides authentication information in the form of the unique identifiers which may be transmitted to the first computing device during the connection between the first computing device and the mobile device. However, if this connection is lost, the computer software at the first computing device cannot verify certain information in the mobile device to enable access. Therefore, access to the computer software is prohibited.

In a scenario about the present invention, a user owns a mobile phone such as mobile device 120 with a large storage capacity in the gigabyte range. The user loads the computer software such as applications onto the mobile phone. The user also provides unique information that identifies the user with the loaded computer software. A few weeks later, while traveling away from home, the user desires to use a computer located in a hotel business center. The user connects the mobile phone to the hotel's computer using a USB cable. The user turns on the computer and gains access to the mobile phone. The user chooses to execute the computer software that is loaded on the phone. Other software in the mobile phone uses the unique information to allow the user to operate the computer software from the hotel's computer. In this scenario, the user may have pre-loaded authentication information with the computer software when it was initially installed on the mobile phone removing any additional need for re-authentication when the phone is connected to the computer and the computer software is accessed. The scenario enables the user to use the computer software on the mobile phone with different computers.

Continuing with the scenario discussed above, while the user is operating the computer with computer software 227 in this case, the user may desire to access the Internet 240. The user may initialize a web browser program that is either stored on the computer or stored on the mobile phone as part of computer software 227. The mobile phone handles the connections to the Internet 240 and enables the web data to be transferred to the computer rather than on the display of the mobile phone. Therefore, the user may operate the computer while also accessing the Internet.

In another scenario, a user purchases an application designed to run from a mobile device. The user provides a unique identifier such as a phone number or ESN. The computer program is compiled to only run from the mobile device with the unique identifier. The user plugs the mobile device into the computing device at his or her home and the computer program may be executed at the computing device in the home. Later, the user unplugs the mobile device from the computing device in the home and plugs the mobile device into a computing device at his or her office. The computing device in the home can no longer access or execute the computer program while the computing device in the office can execute the computer program.

In yet another scenario, a user purchases an application designed to run from a mobile device. The computer program uses the Internet to verify the user status for subscription by relaying unique identifiers such as the phone number or ESN. The user plugs the mobile device into the computing device at the user's home and the user may access and execute the application. As in the scenario above, the user unplugs the mobile device from the computing device in the home and plugs the mobile device into a computing device at his or her office. The computing device in the home can no longer access or execute the computer program while the computing device in the office can execute the computer program.

Although not discussed above, the computer software or application could be a game, a soft phone, or an application such as the MS OFFICE from the Microsoft Corporation of Redmond, Wash. For example, a person may go to work and need the VISIO application developed by the Microsoft Corporation of Redmond, Wash. The application may be loaded in the mobile phone along with data files. The person may run the application from the phone when connected to a computer. When the person is done, the person can unplug the phone keeping the application and data files stored on the phone. Later, the person may plug the phone into another computer have the functionality again.

The prior discussion is only for illustrative purposes to convey exemplary embodiments. The steps discussed in FIGS. 4-8 may be executed without regards to order. Some steps may be omitted and some steps may be executed at a different time than shown. For example, step 550 may be executed before step 540. Step 840 may be executed before step 830. The point here is to convey that the figures are merely exemplary for the embodiments of the present invention and that other embodiments may be implemented for the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A method of operating a wireless communication device to provide wireless Internet access to another computing device, the method comprising:
   storing communication software in the wireless communication device;
   wirelessly transferring a user identifier from the wireless communication device to a wireless communication network, and in response, wirelessly receiving a network authorization for the wireless Internet access into the wireless communication device from the wireless communication network;
   executing the communication software in the wireless communication device to use the wireless Internet access over the wireless communication network in response to the network authorization; and
   wirelessly receiving an Internet access request including the user identifier into the wireless communication device from the other computing device, and in response, executing the communication software to provide the wireless Internet access to the other computing device.

2. The method of claim 1 wherein the user identifier comprises a telephone number of the wireless communication device.

3. The method of claim 1 wherein the user identifier comprises a user name for the wireless communication device.

4. The method of claim 1 wherein the user identifier comprises a user password for the wireless communication device.

5. The method of claim 1 wherein the user identifier comprises an electronic serial number of the wireless communication device.

6. The method of claim 1 wherein the user identifier comprises an international mobile equipment identifier of the wireless communication device.

7. The method of claim 1 wherein the communications between the wireless communication device and the computing device comprise Wireless Fidelity communications.

8. The method of claim 1 wherein the communications between the wireless communication device and the wireless communication network comprise wireless Long Term Evolution communications.

9. The method of claim 1 wherein the communications between the wireless communication device and the computing device comprise Wireless Fidelity communications and wherein the communications between the wireless communication device and the wireless communication network comprise wireless Long Term Evolution communications.

10. The method of claim 1 wherein executing the communication software to provide the wireless Internet access to the other computing device comprises transferring Internet data for delivery to the other computing device.

11. A wireless communication device configured to provide wireless Internet access to another computing device, the wireless communication device comprising:
    a memory configured to store communication software in the wireless communication device;
    a communication interface configured to wirelessly transfer a user identifier from the wireless communication device to a wireless communication network, and in response, to wireless receive a network authorization for the wireless Internet access into the wireless communication device from the wireless communication network;
    the communication interface configured to execute the communication software in the wireless communication device to use the wireless Internet access over the wireless communication network in response to the network authorization;
    the communication interface configured to wirelessly receive an Internet access request including the user identifier into the wireless communication device from the other computing device, and in response, execute the communication software to provide the wireless Internet access to the other computing device.

12. The wireless communication device of claim 11 wherein the user identifier comprises a telephone number of the wireless communication device.

13. The wireless communication device of claim 11 wherein the user identifier comprises a user name for the wireless communication device.

14. The wireless communication device of claim 11 wherein the user identifier comprises a user password for the wireless communication device.

15. The wireless communication device of claim 11 wherein the user identifier comprises an electronic serial number of the wireless communication device.

16. The wireless communication device of claim 11 wherein the user identifier comprises an international mobile equipment identifier of the wireless communication device.

17. The wireless communication device of claim 11 wherein the communications between the wireless communication device and the computing device comprise Wireless Fidelity communications.

18. The wireless communication device of claim 11 wherein the communications between the wireless communication device and the wireless communication network comprise wireless Long Term Evolution communications.

19. The wireless communication device of claim 11 wherein the communications between the wireless communication device and the computing device comprise Wireless Fidelity communications and wherein the communications between the wireless communication device and the wireless communication network comprise wireless Long Term Evolution communications.

20. The wireless communication device of claim 11 wherein the communication interface configured to execute the communication software to provide the wireless Internet access to the other computing device comprises the communication interface configured to transfer Internet data for delivery to the other computing device.

* * * * *